(12) United States Patent
Nolan-Brown

(10) Patent No.: US 6,485,154 B1
(45) Date of Patent: Nov. 26, 2002

(54) CAR SEAT SAFETY MIRROR

(76) Inventor: Patricia Nolan-Brown, 27 Parker Rd., Wakefield, MA (US) 01880

( * ) Notice: Subject to any disclaimer, the term of this patent is extended or adjusted under 35 U.S.C. 154(b) by 0 days.

(21) Appl. No.: 09/500,930

(22) Filed: Feb. 15, 2000

(51) Int. Cl.$^7$ .......................... G02B 5/08; G02B 7/182; B60R 1/04
(52) U.S. Cl. ........................................ 359/872; 359/881
(58) Field of Search ............................... 359/871, 872, 359/881, 857

(56) References Cited

U.S. PATENT DOCUMENTS

| | | | |
|---|---|---|---|
| 4,188,745 A | * | 2/1980 | Harvey et al. |
| 4,359,266 A | * | 11/1982 | Rohlf et al. |
| 4,661,072 A | * | 4/1987 | White |
| 4,702,572 A | * | 10/1987 | Cossey |
| 4,712,892 A | * | 12/1987 | Masucci |
| 4,902,118 A | * | 2/1990 | Harris |
| 5,103,347 A | * | 4/1992 | Lumbra et al. |
| 5,453,915 A | * | 9/1995 | Bradley, III |
| 5,489,075 A | * | 2/1996 | Ible |
| 6,030,085 A | * | 2/2000 | Leam et al. ................ 359/871 |
| 6,039,455 A | * | 3/2000 | Sorenson .................... 359/872 |
| 6,217,180 B1 | * | 4/2001 | Eisenbraum ............... 359/872 |

* cited by examiner

Primary Examiner—Ricky D. Shafer
(74) Attorney, Agent, or Firm—John P. McGonagle

(57) ABSTRACT

A mirror attached to a child car safety seat. The mirror is attached to the car seat by means of a flexible stem connected to a base module attached to the car seat. The stem may be bent to any desired position. The base module may be manipulated to also alternate the position of the mirror. The mirror and stem may be removed from the base module. A fabric cover with elastic edging is positioned over the back of the mirror and flexible stem. The fabric cover may have a stuffed figure attached thereto.

12 Claims, 8 Drawing Sheets

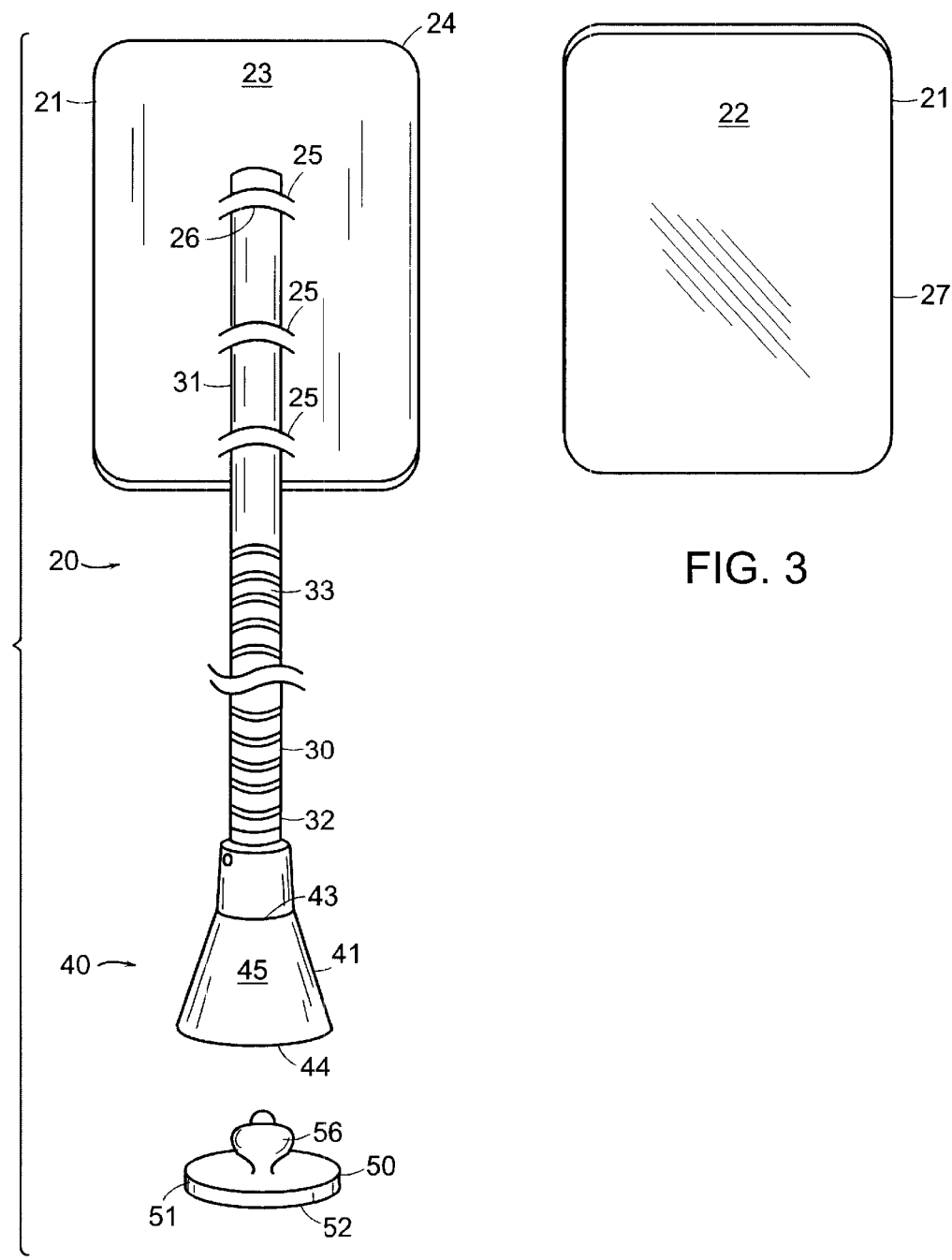

CAR SEAT SAFETY MIRROR

BACKGROUND OF THE INVENTION

This invention relates to mirrors and, in particular, to a mirror adapted to being attached to a child car safety seat.

The "Child Passenger Protection Act" which became law in 1983, required that an infant travelling in a vehicle be secured in a safety seat that is itself fastened to the center of the rear seat of the vehicle by means of seat belts. Updates to the law will shortly require these car seats to be anchored by a tether strap to the structure of the car itself. It has become common practice, as a result of the recommendations of child safety advocates, to position a child car safety seat such that an infant faces the rear of the vehicle. Positioning the infant facing the rear seat is intended to protect the infant in the event of an accident by insuring that the infant will be projected toward the soft car seat back. As the infant becomes an older and larger baby, the child car safety seat is positioned so that the baby and safety seat are facing forward.

Child car safety seats are often constructed with side panels that can obstruct any view of the infant when the infant is in the car seat. This, plus the rear-facing orientation of a safety seat, makes it very difficult for a driver to check on the condition of a rearwardly facing infant. If the infant is crying or otherwise giving indications of distress, the driver, if alone, is put in the position of having to stop the car in order to check on the infant. This can be inconvenient at best, and dangerous at worst if there is no safe roadside location to which the driver may safely drive the vehicle. If there is another passenger in the car, the passenger must turn her/his body and lean back over the front seat. In either case, the situation is dangerous or inconvenient. If the infant is quiet, it is important that the driver or passenger be able to monitor the infant to ensure that nothing untoward has happened to the infant. With front-facing safety seats, there is often a problem directly viewing the baby because of the configuration of the vehicle containing the safety seat.

SUMMARY OF THE INVENTION

The present invention provides a mirror which is primarily intended for direct attachment to a child car safety seat. The mirror of the present invention is adapted to being attached to the car seat itself, the car seat base, the car seat canopy, handle or any of the straps holding the car seat in place. The mirror is attached to the car seat by means of a flexible stem thereby permitting the user to easily bend and position the mirror in the most advantageous position. To soften and reduce the starkness of a mirror to a child, a fabric cover with elastic edging is positioned over the back of the mirror and flexible stem. The fabric cover may have a stuffed figure attached thereto.

It is, therefore, a primary purpose of the present invention, which will be described subsequently in greater detail, to provide a new, improved, inexpensive, easy-to-install device by which the driver of a vehicle, may easily observe a child in a child car safety seat placed in the rear seat of the vehicle.

This together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

FIG. 2 is rear view of one embodiment of the invention.

FIG. 3 is a front view of the mirror portion of the invention illustrated in FIG. 2.

DETAILED DESCRIPTION OF THE INVENTION

Figure 1:
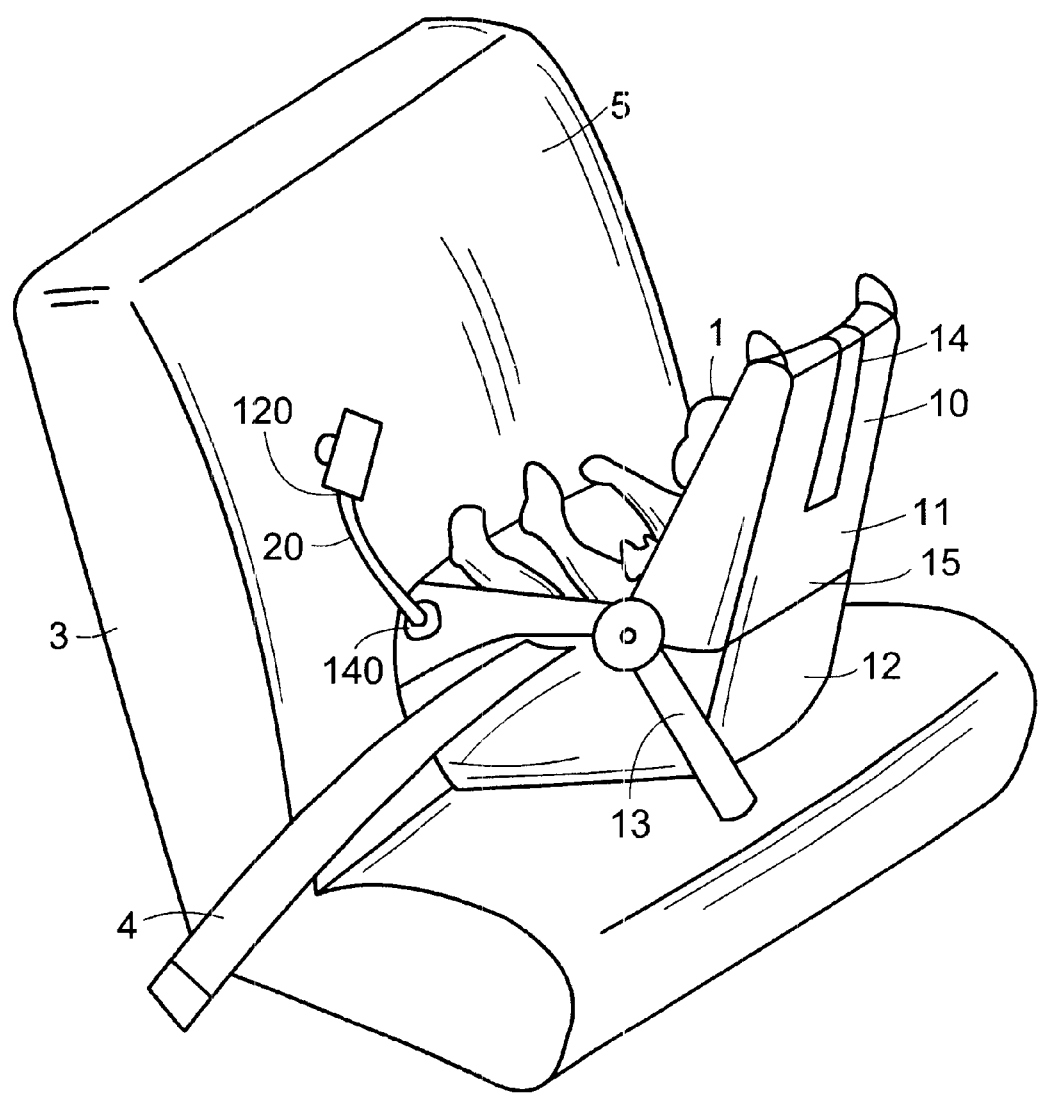
FIG. 1 is a perspective view of the invention in use in an automobile.
Figure 4:
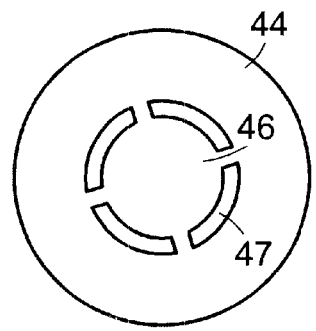
FIG. 4 is a bottom view of the base module connection element of the invention embodiment of FIG. 2.
Figure 5:
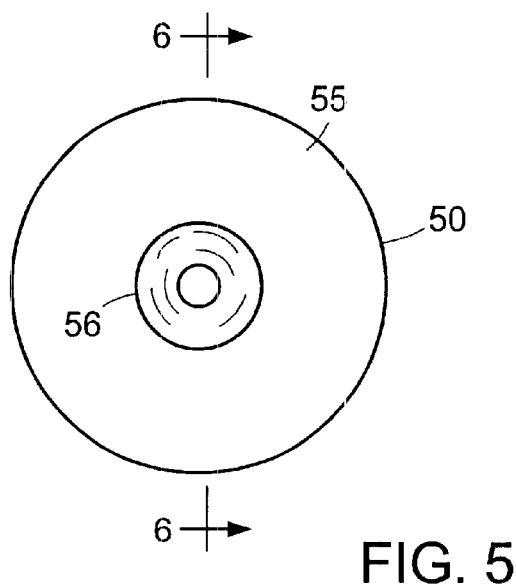
FIG. 5 is a top view of the base module attachment element of the invention embodiment of FIG. 2.
Figure 6:
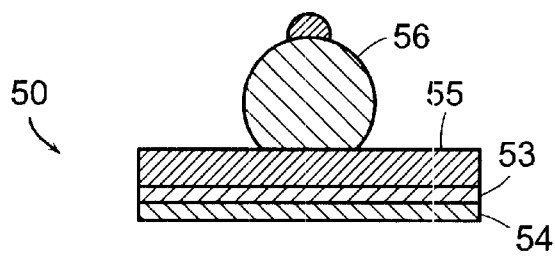
FIG. 6 is a cross sectional view along the line 6—6 of FIG. 5.
Figure 7:
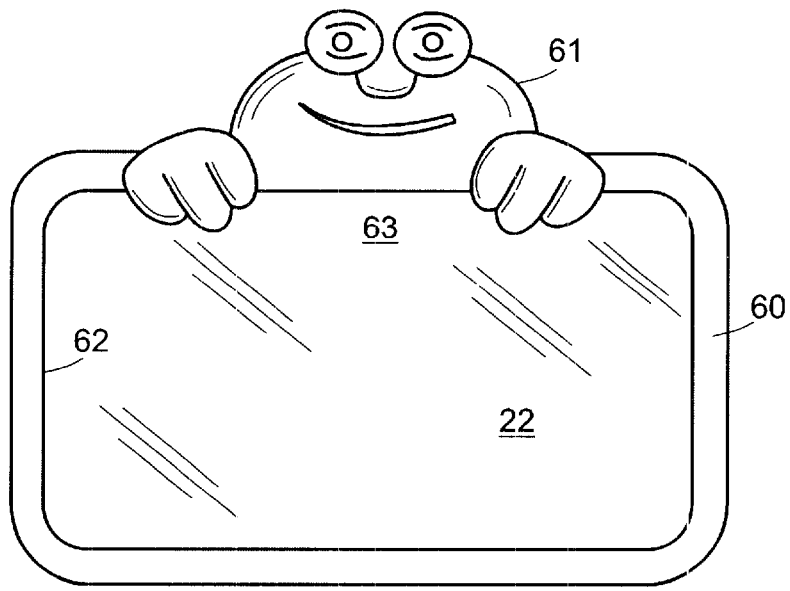
FIG. 7 is an elevational view of the mirror reflective surface with the fabric cover.
Figure 8:
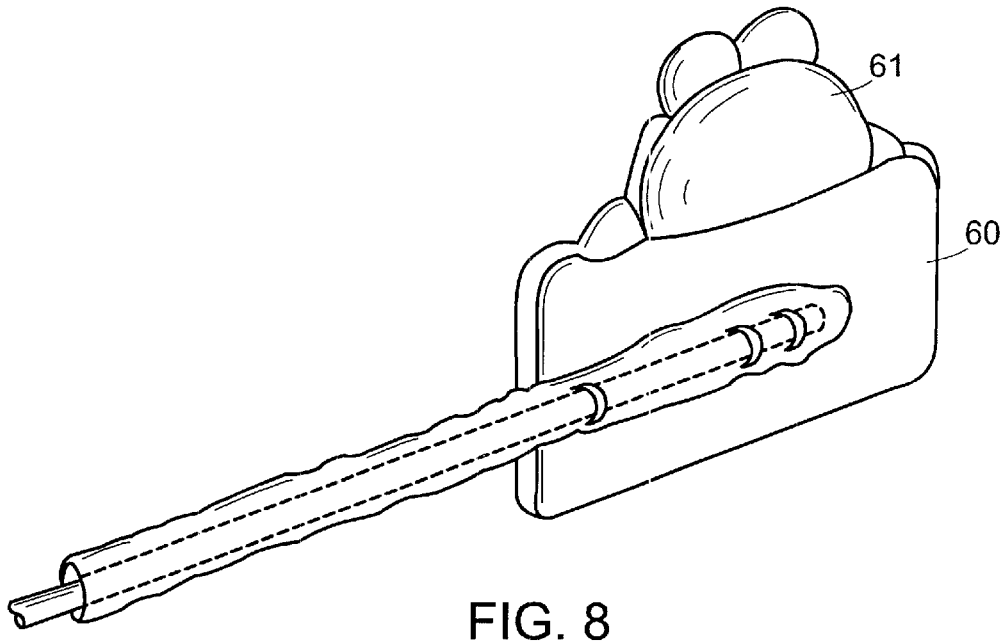
FIG. 8 is a rear perspective view, partly in section, of the mirror and stem portions with fabric cover.
Figure 9:
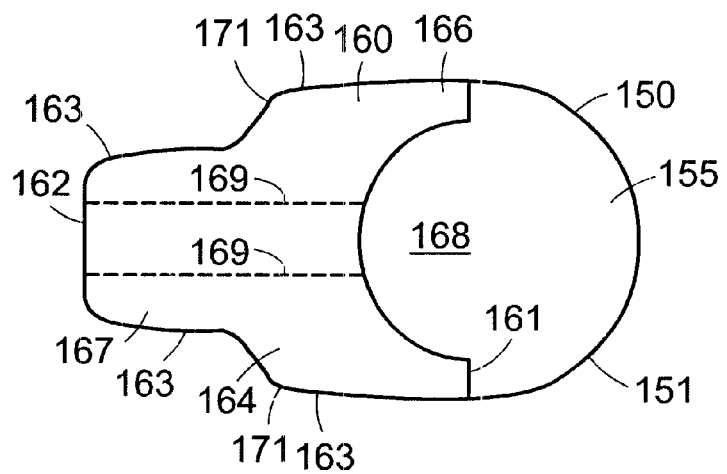
FIG. 9 is a top, plan view of an attachment element of another embodiment of the invention.
Figure 10:
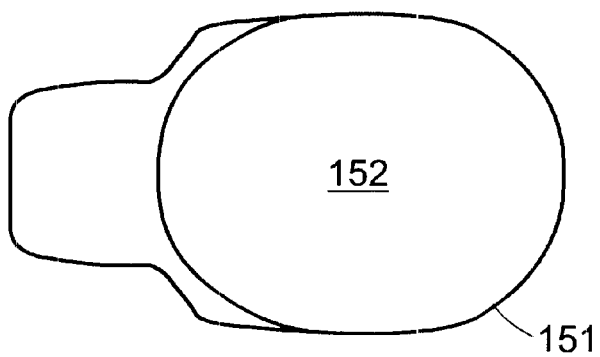
FIG. 10 is a bottom view of the attachment element of FIG. 9.
Figure 11:
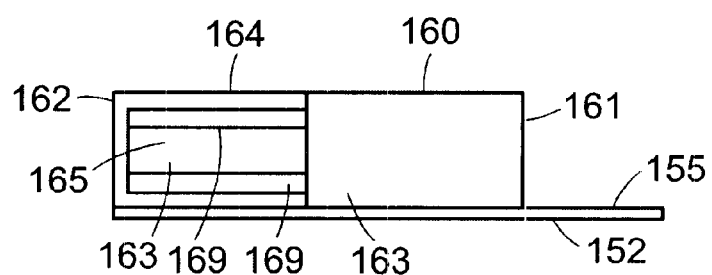
FIG. 11 is a side, elevational view of the attachment element of FIG. 9.
Figure 12:
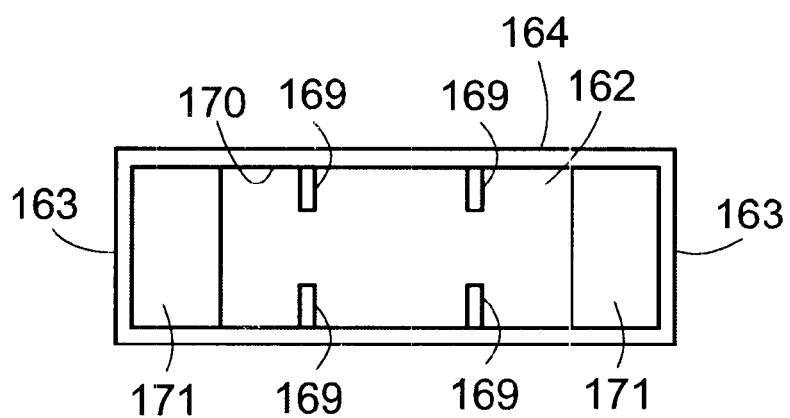
FIG. 12 is a front, elevational view of the attachment element of FIG. 9.
Figure 13:
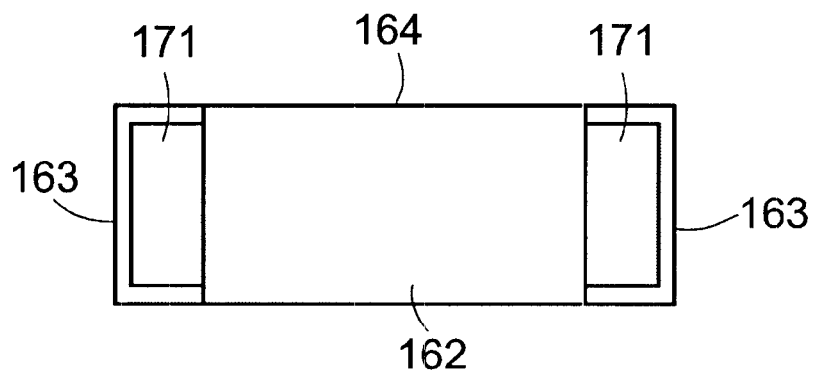
FIG. 13 is a rear, elevational view of the attachment element of FIG. 9.

Referring to the drawings in detail wherein like elements are indicated by like numerals, there is shown in FIG. 1 a vehicle rear seat 3 with a child car safety seat 10 attached by means of a seat belt 4. An infant 1 is placed in the car safety seat 10 facing the back rest 5 of the rear seat 3. The device 20, 120 of the present invention provides a mirror 21, 121 having a reflecting surface 22, 122 on one of its sides and a non-reflecting surface 23, 123 on the obverse side. The mirror 21, 121 may be rectangular, round, or any other desired shape. The reflecting surface 22, 122 may be planar or convex for a wider field of view. The mirror 21, 121 in one embodiment, is attached to a wire stem 30, 130 which terminates in a base module 40, 140. The wire stem 30, 130 is flexible but will hold its shape after being bent. This permits the mirror 21, 121 to be positioned exactly as desired by the user. The base module 40, 140 provides a means for attaching the invention device 20, 121 to a car seat 10. This permits the driver (not shown) to observe the infant 1 by means of an image reflected from the invention device 20, 120.

The child car safety seat 10 may be of an integral, single-piece construction or may be a two-part construction comprised of a removable car seat component 11 attached to a car seat base 12. The car seat base 12 will generally stay in place in the car attached to the vehicle rear seat 3. Most infant car safety seats 10 will also have a carrying handle 13 attached thereto. The car safety seat 10 may have a tether strap 14 attached to attached to the car seat rear 15.

Referring to the invention embodiment illustrated in FIGS. 2–8, the invention device 20 is comprised of a mirror 21 attached by means of a stem 30 to a base module 40. In one embodiment of the invention the mirror 21 has a generally rectangular, planar shape and is made out of a rigid, light weight material, such as plastic, with a non-glass reflective coating on the mirror reflecting surface side 22. Although rectangular in shape, the planar corners 24 of the mirror 21 are rounded for safety. The mirror's non-reflective side 23 has three, parallel half-rings 25 attached thereto along the side's central, longitudinal axis.

The stem 30 has two end portions, a mirror end portion 31 and a base end portion 32, said end portions being interconnected by an elongated, flexible, wire portion 33. The stem mirror end portion 31 is inserted through openings 26 formed by the half-rings 25 along the non-reflecting mirror side 23. Although the stem mirror end portion 31 fits snugly within the ring openings 26, the mirror 21 may be rotated radially about the stem mirror end portion 31.

In one embodiment of the invention, the base module 40 is comprised of a connection element 41 and an attachment element 50. The stem base end 32 terminates in a frustum-shaped connection element 41. The connection element 41 has a small diameter top 43, a parallel large diameter bottom 44, and a side wall 45 interconnecting said top 43 and bottom 44. The stem base end 32 is fixedly joined to said side wall 45. The connection element bottom 44 has a rounded aperture 46 formed therein with a radial flange element 47 about the aperture near the connection element bottom 44. The attachment element 50 is comprised of a generally disk-like element 51 with a flat, planar attachment side 52 and a receiving side 55. The attachment side 52 has an adhesive coating 53 applied thereto and may have a removable, protective paper covering 54 over the adhesive coating 53 to protect the adhesive prior to use. The receiving side 55 has a rounded element 56 formed centrally on the receiving side 55, said element having the shape of an approximate two-thirds sphere. The connection element aperture 46 is adapted to matingly join the attachment element receiving side rounded element 56. The attachment element attachment side 52 may be adhered to any desired portion of the car safety seat 10 including the carrying handle 13, tether strap 14, seat belt 4, removable car seat component 11 or base 12.

In another embodiment of the invention a fabric cover 60 may be positioned over a portion of the invention device 20 to soften and reduce the starkness of a mirror to a child. The fabric cover 60 may have a stuffed FIG. 61 attached thereto. The fabric cover 60 and FIG. 61 will attract an infant 1 causing the infant to turn his or her face toward the invention device 20. This will enable an observer to more readily check on the condition of the infant by directly observing the infant's face. The fabric cover 60 will be shaped to just fit over the mirror 21 covering the mirror non-reflecting surface 23 and just covering the edges 27 of the mirror reflecting surface 22. An elastic edging 62 is formed along the perimeter of the fabric opening 63 about the mirror reflecting surface 22 thereby holding the fabric 60 in place on the mirror 21. The fabric cover 60 may be adapted to also continuously cover all or a portion of the stem 30. The FIG. 61 would preferably be attached to a portion of the fabric 60 about the mirror reflecting surface 22 to attract the infant.

Figure 15:
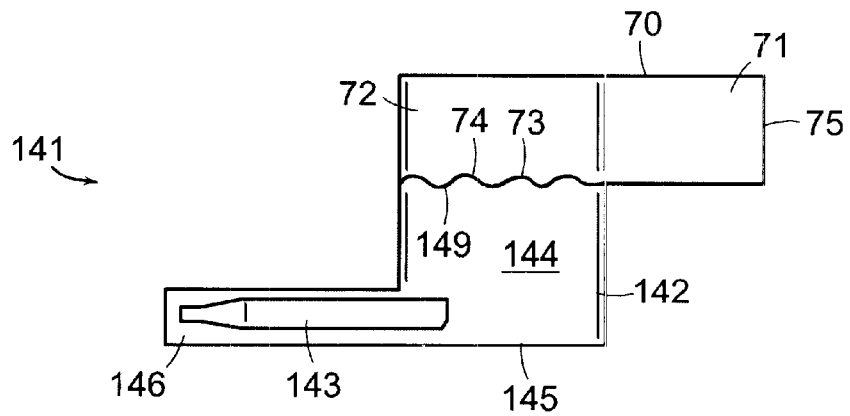
FIG. 15 is a side, elevational view of the connection element of FIG. 14.
Figure 16:
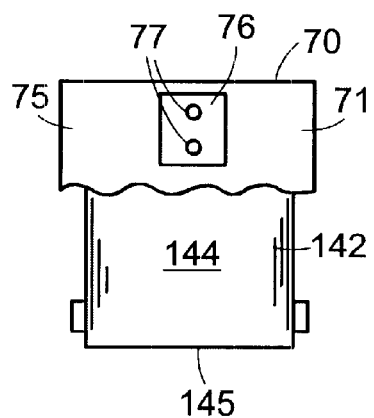
FIG. 16 is a front, elevational view of the connection element of FIG. 14.
Figure 17:
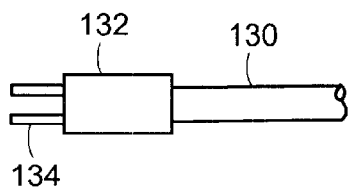
FIG. 17 is a side elevational view, partly in section of the stem base end of another embodiment of the invention.
Figure 18:
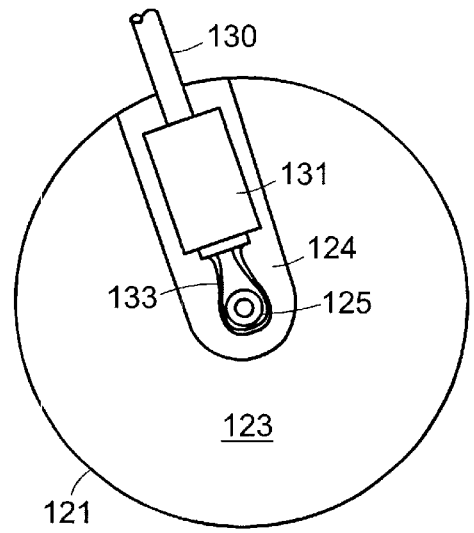
FIG. 18 is a view, partly in section, of the stem mirror end portion of another embodiment of the invention.
Figure 19:
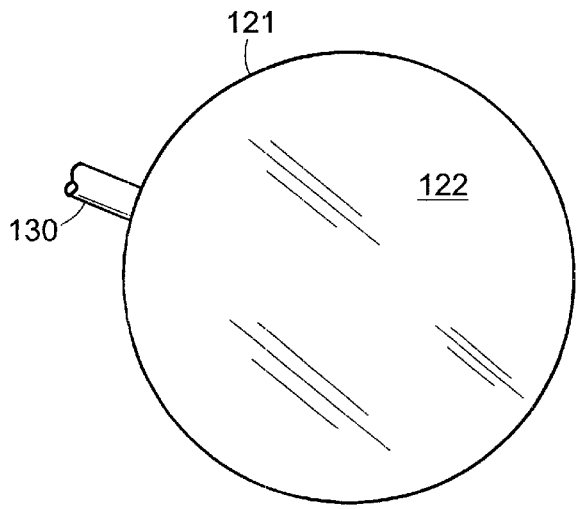
FIG. 19 is a front elevational view of the mirror reflecting surface of another embodiment of the invention.

Another embodiment of the invention is illustrated in FIGS. 9–19. The invention device 120 is comprised of a mirror 121 attached by means of a stem 130 to a base module 140. The mirror's non-reflective side 123 (FIG. 18) has a radial groove 124 with a protruding post 125 contained therein. The stem 130 has two end portions, a mirror end portion 131 and a base end portion 132, said end portions being interconnected by an elongated, flexible, wire portion 133. The stem mirror end portion 131 is positioned in the mirror, non-reflective side groove 124. The stem mirror end portion 131 has a loop of wire 133 protruding therefrom, said loop 133 being attached to the post 125 within the mirror groove 124. The stem base end 132 has two prongs 134 protruding therefrom (FIG. 17).

The base module 140 is comprised of a connection element 141 and an attachment element 150. The base module attachment element 150 is attached directly to a child car safety seat 10. The base module connection element 141 is removably attached to one end 132 of the stem 130 and is removably joined to the base module attachment element 150. Referring in particularly to FIGS. 9–13, the attachment element 150 is comprised of a generally oblong element 151 with a flat, planar attachment side 152 and a receiving side 155 with a housing 160 mounted thereon. The attachment side 152 has an adhesive coating applied thereto and may have a removable, protective paper covering over the adhesive coating to protect the adhesive prior to use. The receiving side 155 has a housing 160 formed thereon.

The housing 160 has a front 161, rear 162, two identical sides 163 and a top 164. The bottom of the housing is the oblong element receiving side 155. The housing front 161, rear 162, top 164 and bottom 155 define a hollow interior 165. The housing 160 is divided into a front portion 166 and a rear portion 167. The front 161 is an opening in the front portion 166. See FIG. 12. The rear 162 is a solid wall in the rear portion 167. See FIG. 13. The front portion 166 has a semi-circular recess 168 formed therein opening onto the front 161. The rear portion 167 has a generally square shape with a width less than the diameter of the front portion semicircular recess 168. See FIG. 9. The rear portion sides 163 are open. See FIG. 11. Two parallel ridges 169 are formed on the housing bottom 155 and the interior 170 of the top 164. See FIGS. 9, 11 and 12. The front portion rear 171 is also open. See FIGS. 12 and 13.

Figure 14:
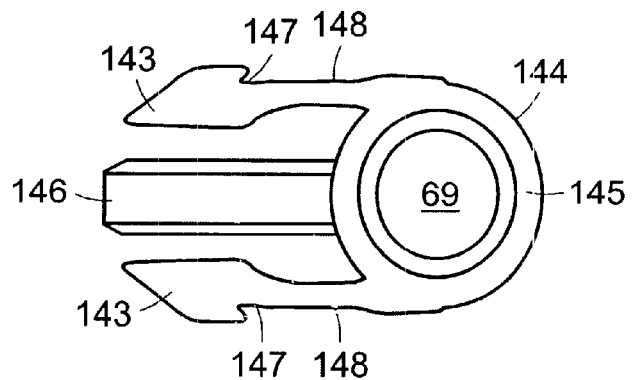
FIG. 14 is a bottom view of the connection element of another embodiment of the invention.

The base module 140 connection element 141 interconnects the stem 130 to the base module attachment element 150. Referring particularly to FIGS. 14–16, the connection element 141 is comprised of a hollow cylinder 142 with two elongated, arrow-like, parallel elements 143 radially extending from opposite portions of the cylinder side wall 144 at the cylinder bottom 145. An elongated spacer element 146 extends radially from the cylinder side wall 144 and cylinder bottom 145 between the arrow-like elements 143. The diameter of the cylinder 142 is slightly less than the diameter of the attachment element housing semicircular recess 168. The connection element 141 is adapted to removably mate with the attachment element 150 by means of the connection element arrows 143 and spacer element 146 sliding into the attachment element open housing front 161 whereby the arrows protrude through the housing front portion open rear 171 and rear portion open sides 163. The connection element spacer element 146 slides between the attachment element housing parallel ridges 169. The connection element arrow-like elements 143 have notches 147 formed on their outside edges 148 wherein the notches 147 engage the attachment element housing front portion sides 163 when the connection element 141 is fully inserted into the attachment element housing 160.

The connection element cylinder 142 has a spring mechanism 69 fixedly contained therein. A generally elongated module 70 is attached to the spring mechanism 69 and seated on the top 149 of the cylinder 142. The elongated module 70 has a generally rectangular front portion 71 terminating in a generally cylindrically-shaped rear portion 72. The rear portion bottom 73 is serrated as is the connection element cylinder top 149. The module rear portion 73 is adapted to being pulled away from the cylinder top 149 along the cylinder's central axis and radially twisted to a desired position. Upon release of the elongated module rear portion 72 the spring mechanism 69 draws the module rear portion bottom 73 into engagement with the cylinder top 149. The serrations 74 radially lock the module 70 into a desired radial position. The module front portion 71 has a front face 75 with a generally rectangular recess 76 formed therein. The recess 76 has two holes 77 formed therein, said holes 77 being in planes parallel to the radial axis of the cylinder 142. The stem base end prongs 134 are adapted to engage the module recess holes 77, thereby removably connecting the stem 130 and mirror 121 to the base module 140.

The base module attachment element attachment side 152 may be adhered to any desired portion of the car safety seat 10 including the carrying handle 13, tether strap 14, seat belt 4, removable car seat component 11 or base 12.

As with the first embodiment of the invention, a fabric cover may be positioned over a portion of the invention device 20 to soften and reduce the starkness of a mirror to a child. The fabric cover may have a stuffed figure attached thereto. The fabric cover and figure will attract an infant causing the infant to turn his or her face toward the invention device 120. This will enable an observer to more readily check on the condition of the infant by directly observing the infant's face.

Thus it can be seen that the device described in varying embodiments provides an inexpensive, easily installed and easily re-positioned device by which a driver of a vehicle can monitor the activity of a rear-facing infant in a child car safety seat. While the above description contains many specifics, these should not be construed as limitations on the scope of the invention, but rather as an exemplification of preferred embodiments thereof. Many other variations are possible. For example, the adhesive coating 53 of the attachment element 50 could be replaced with a mechanical fastener or a hook and pile fastener arrangement. The half-ring 25—stem mirror end portion 31 arrangement could be replaced with a swivel mechanism or could be directly and fixedly attached. While the stem 30 is preferably made from wire, it could also be telescopic or mechanically hinged for positioning. It is understood that the above-described embodiments are merely illustrative of the application. Other embodiments may be readily devised by those skilled in the art which will embody the principles of the invention and fall within the spirit and scope thereof.

I claim:

1. A mirror device directly attached to a child car safety seat located in a rear seat of a vehicle whereby a vehicle driver or front seat passenger may observe a child in said car safety seat and facing the back rest of said rear seat by means of an image reflected from the mirror device, comprising:
    a mirror with a perimeter edge and having a reflecting surface on one of its sides and an obverse side;
    a base module attached to said car safety seat, comprising:
        an attachment element attached to said child car safety seat; and
        a connection element, said connection element being removably attached to a stem base end portion, and being removably joined to said attachment element;
    an elongated, flexible stem interconnecting said mirror to said base module, said stem having two end portions, a mirror end portion and said stem base end portion, said stem being adapted to hold its shape after being bent; and
    a fabric cover fitted over the mirror obverse side and just covering the perimeter edge of the mirror reflecting surface;
    wherein said base module connection element has a frustum shape with a small diameter top, a parallel large diameter bottom, and a side wall interconnecting said top and bottom, said stem base end portion being fixedly joined to said side wall, said connection element bottom having a rounded aperture formed therein with a radial flange element about the aperture near the connection element bottom;
    wherein said attachment element is comprised of a generally disk-like element with a flat, planar attachment side and a receiving side, said attachment side having connection means applied thereto, said receiving side having a rounded element formed centrally thereon, said rounded element having the shape of an approximate two-thirds sphere;
    wherein said connection element aperture is adapted to matingly join the attachment element receiving side rounded element.

2. A mirror device as recited in claim 1, wherein:
    said attachment element attachment side connection means is comprised of an adhesive coating.

3. A mirror device as recited in claim 2, further comprising:
    a removable, protective paper covering over said adhesive coating.

4. A mirror device as recited in claim 3, wherein:
    said mirror obverse side has a plurality of parallel half-rings attached thereto;
    wherein said stem mirror end portion is adapted to being inserted through openings formed by said half-rings.

5. A mirror device as recited in claim 4, further comprising:
    a stuffed figure attached to said fabric cover.

6. A mirror device as recited in claim 1, wherein:
    said base module attachment element is comprised of a generally oblong element with a flat, planar attachment side and a receiving side with a housing mounted thereon, said attachment side having connection means applied thereto, said housing having a front, rear, two identical sides, a top, and a bottom, said housing bottom being the oblong element receiving side, said housing front, rear, top and bottom defining a hollow interior, said housing being divided into a front portion and a rear portion, said housing front being an opening in the said front portion, said housing rear being a solid wall in the rear portion, said front portion of the housing top having a semi-circular recess formed therein opening onto the housing front, said rear portion having a generally rectangular shape with a width less than the diameter of the front portion semicircular recess, said rear portion of the housing sides being open, two parallel ridges being formed on the housing bottom and an interior of the housing top, said front portion having an open rear.

7. A mirror device as recited in claim 6, wherein:
    said base module connection element is comprised of a hollow cylinder having a bottom, a side wall extending from said hollow cylinder bottom and terminating in a serrated top, said cylinder side wall at the cylinder bottom having two elongated, arrow-like, parallel elements radially extending from opposite portions of the side wall, said side wall having an elongated spacer element extending radially from the cylinder side wall and cylinder bottom between the arrow-like elements, said cylinder having a diameter slightly less than the diameter of the attachment element housing semicircular recess;

wherein said connection element is adapted to removably mate with the attachment element by means of the arrow-like elements and spacer element sliding into the attachment element receiving side housing front portion whereby the arrows protrude through the housing front portion open rear and housing rear portion open sides, said connection element spacer element sliding between the attachment element housing parallel ridges, said connection element arrow-like elements having outside edges and notches formed thereon wherein the notches engage the sides of the attachment element receiving side housing front portion when the connection element is fully inserted into the attachment element housing;

wherein said connection element cylinder has a spring mechanism fixedly contained therein and a generally elongated module attached to the spring mechanism and seated on the top of the cylinder, said elongated module having a generally rectangular front portion terminating in a generally cylindrically-shaped rear portion, said cylindrically-shaped rear portion having a serrated bottom, said module rear portion being adapted to being pulled away from the cylinder top along the cylinder's central axis and radially twisted to a desired position, where upon release of the elongated module rear portion the spring mechanism draws the module rear portion bottom into engagement with the cylinder top.

8. A mirror device as recited in claim 7, wherein:

said elongated module front portion has a front face with a recess formed therein, said recess having two holes formed therein;

said stem base end portion having two prongs adapted to engage said module recess holes, thereby connecting the stem and mirror to the base module.

9. A mirror device as recited in claim 8, wherein:

said attachment element attachment side connection means is comprised of an adhesive coating.

10. A mirror device as recited in claim 9, further comprising:

a removable, protective paper covering over said adhesive coating.

11. A mirror device as recited in claim 10, wherein:

said mirror obverse side has a radial groove with a protruding post;

said stem mirror end portion being positioned in said radial groove;

said stem mirror end portion having a loop of wire protruding therefrom, said loop adapted to being attached to said protruding post.

12. A mirror device as recited in claim 11, further comprising:

a stuffed figure attached to said fabric cover.

* * * * *